US009582572B2

(12) United States Patent
Mo et al.

(10) Patent No.: US 9,582,572 B2
(45) Date of Patent: Feb. 28, 2017

(54) PERSONALIZED SEARCH LIBRARY BASED ON CONTINUAL CONCEPT CORRELATION

(71) Applicant: Intel Corporation, Santa Clara, CA (US)

(72) Inventors: Stanley Mo, Portland, OR (US); Rita H. Wouhaybi, Portland, OR (US); Mubashir A. Mian, Santa Clara, CA (US); Tobias M. Kohlenberg, Portland, OR (US); Jim S. Baca, Corrales, NM (US)

(73) Assignee: Intel Corporation, Santa Clara, CA (US)

( * ) Notice: Subject to any disclaimer, the term of this patent is extended or adjusted under 35 U.S.C. 154(b) by 522 days.

(21) Appl. No.: 13/719,563

(22) Filed: Dec. 19, 2012

(65) Prior Publication Data
US 2014/0172828 A1 Jun. 19, 2014

(51) Int. Cl.
*G06F 17/30* (2006.01)
(52) U.S. Cl.
CPC .. *G06F 17/30702* (2013.01); *G06F 17/30867* (2013.01); *G06F 2216/01* (2013.01)
(58) Field of Classification Search
CPC ......... G06F 17/30867; G06F 17/30864; G06F 2216/01
USPC .......................... 707/748, E07.108, 722, 661
See application file for complete search history.

(56) References Cited

U.S. PATENT DOCUMENTS

| 584,407 | A | * | 6/1897 | Saint Cyr, Jr. ................ 606/160 |
| 5,848,407 | A | * | 12/1998 | Ishikawa et al. |
| 6,823,331 | B1 | | 11/2004 | Abu-Hakima |
| 7,668,953 | B1 | * | 2/2010 | Sinclair et al. ............... 709/224 |

(Continued)

FOREIGN PATENT DOCUMENTS

| WO | 2013085524 A1 | 6/2013 |
| WO | 2013100978 A1 | 7/2013 |

OTHER PUBLICATIONS

"Google Analytics," Wikipedia, The Free Encyclopedia, retrieved from: <http://en.wikipedia.org/w/index.php?title=Google_Analytics&oldid=514879503>, edited Sep. 27, 2012, 7 pages.

(Continued)

*Primary Examiner* — Baoquoc N To
(74) *Attorney, Agent, or Firm* — Barnes & Thornburg LLP (57) ABSTRACT

A system, devices, and methods for providing a personalized search library based on continual concept correlation include a client computing device and a personalized content server. Content events representing content accessed or manipulated by a user of the client computing device are continually generated. Content associated with the content events is continually parsed and analyzed to extract main concepts. The extracted concepts are correlated and weighted into a concept model, based on the order of the content events. The concept model parallels the structure of the user's memory. Data sources are continually searched for content relevant to a current context of the concept model. Relevant content is indexed according to the concept model. The relevant con- (Continued)

tent may be made available to the user upon request or proactively. Relevant content may be cached for future use by the user. Other embodiments are described and claimed.

20 Claims, 7 Drawing Sheets (56) References Cited

U.S. PATENT DOCUMENTS

| | | | | |
|---|---|---|---|---|
| 7,840,285 | B2* | 11/2010 | Wilson | G05B 19/042 700/1 |
| 8,291,679 | B2* | 10/2012 | Bourque | A61J 1/03 206/539 |
| 8,479,149 | B2* | 7/2013 | Kuriakose | 717/104 |
| 8,615,313 | B2* | 12/2013 | Wilson | G05B 19/042 700/1 |
| 8,676,859 | B2* | 3/2014 | Sayal | G06N 5/022 707/802 |
| 9,195,640 | B1* | 11/2015 | Donneau-Golencer | G06F 17/28 |
| 2002/0184108 | A1* | 12/2002 | Hatakama | G06Q 30/0629 705/26.64 |
| 2005/0071328 | A1 | 3/2005 | Lawrence | |
| 2005/0278362 | A1* | 12/2005 | Maren | G06N 5/025 |
| 2007/0073680 | A1* | 3/2007 | Kawamura | G06F 17/30734 |
| 2007/0244571 | A1* | 10/2007 | Wilson | G05B 19/042 700/11 |
| 2007/0250468 | A1* | 10/2007 | Pieper | G06F 17/3089 |
| 2008/0097994 | A1* | 4/2008 | Teramoto | G06F 17/30943 |
| 2008/0262874 | A1* | 10/2008 | Toshimitsu | G06F 19/3487 705/3 |
| 2009/0055390 | A1* | 2/2009 | Maeda | G06F 17/30707 |
| 2009/0254877 | A1* | 10/2009 | Kuriakose | G06F 8/36 717/105 |
| 2010/0076965 | A1* | 3/2010 | Kamada | G06F 17/30867 707/728 |
| 2010/0306249 | A1* | 12/2010 | Hill et al. | 707/769 |
| 2011/0047161 | A1 | 2/2011 | Myaeng et al. | |
| 2011/0066598 | A1* | 3/2011 | Wilson | G05B 19/042 707/661 |
| 2011/0178026 | A1 | 7/2011 | Braun et al. | |
| 2011/0179026 | A1 | 7/2011 | Mulligen et al. | |
| 2011/0321073 | A1 | 12/2011 | Yarvis et al. | |
| 2012/0185497 | A1 | 7/2012 | Doganata et al. | |
| 2012/0246000 | A1 | 9/2012 | Yarvis et al. | |
| 2012/0246684 | A1 | 9/2012 | Yarvis et al. | |
| 2013/0073336 | A1* | 3/2013 | Heath | 705/7.29 |
| 2013/0073387 | A1* | 3/2013 | Heath | 705/14.53 |
| 2013/0073389 | A1* | 3/2013 | Heath | 705/14.54 |
| 2013/0073400 | A1* | 3/2013 | Heath | 705/14.73 |
| 2013/0073473 | A1* | 3/2013 | Heath | 705/319 |
| 2013/0117383 | A1* | 5/2013 | Hymel | 709/206 |
| 2013/0132366 | A1* | 5/2013 | Pieper | 707/710 |
| 2014/0028603 | A1* | 1/2014 | Xie et al. | 345/173 |

OTHER PUBLICATIONS

Layton, J., "How Amazon Works," HowStuffWorks.com, Jan. 25, 2006, retrieved from: <http://money.howstuffworks.com/amazon.htm>, 5 pages.

International Search Report and Written Opinion Received for International Application No. PCT/US2013/074101, mailed Mar. 7, 2014, 13 pages.

* cited by examiner

PERSONALIZED SEARCH LIBRARY BASED ON CONTINUAL CONCEPT CORRELATION

BACKGROUND

Networks, especially publicly available networks such as the Internet, often contain a vast amount of human knowledge embodied as content distributed in an unstructured network of remote hosts. The amount of content available on the Internet and other networks increases constantly. However, individual users are generally interested in only a small subset of content available on the entire Internet or other networks. Users typically access such content through a search engine. A search engine must maintain an index of the entire Internet/network (or a large subset of such networks), and this index of the Internet/network is used for processing search requests from all users. Further, each search engine maintains its own search index and related search algorithms. Locating relevant content, therefore, requires the user to adapt his or her search strategy to the particular search engine or search engines being used. Thus, the user must craft a single search statement that returns relevant results using the capabilities of the particular search engine. After issuing the search, the user typically must manually winnow search results to remove irrelevant results, and may manually revise the search statement.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
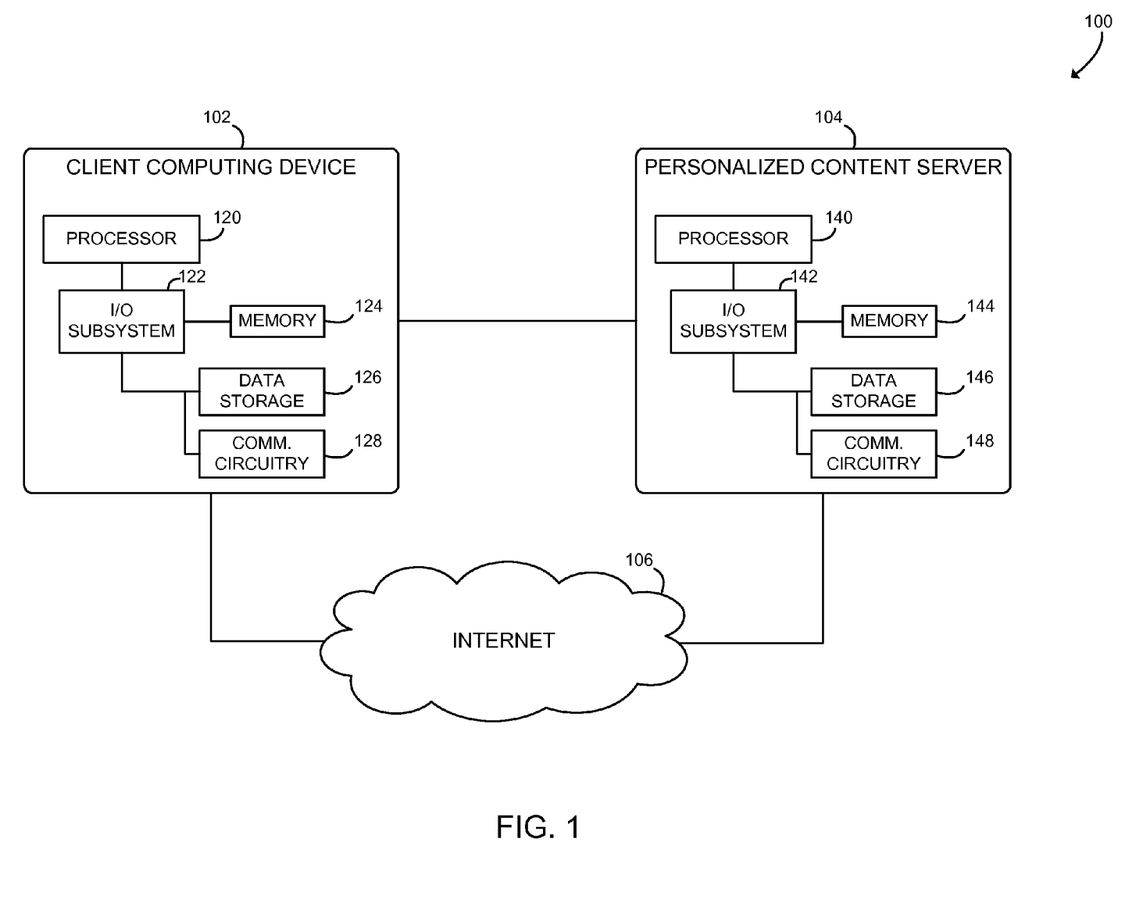
FIG. 1 is a simplified block diagram of at least one embodiment of a system for providing a personalized search library based on continual concept correlation.

Referring now to FIG. 1, in the illustrative embodiment, a system 100 for providing a personalized search library based on continual concept correlation includes a client computing device 102 and a personalized content server 104 in communication with each other over a network, such as the Internet 106. In use, as discussed in more detail below, the client computing device 102 is configured to generate content events based on content searched, accessed, or otherwise manipulated by a user of the client computing device 102. The personalized content server 104 is configured to continually analyze the content events to extract content concepts, correlate the content concepts, and maintain a personalized search library indexing content relevant to the correlated concepts. In other embodiments, the client computing device 102 may be configured to perform some or all of the tasks performed by the personalized content server 104 in the illustrative embodiment, and vice versa. Additionally, although the system 100 is described below in regard to the Internet 106, it should be appreciated that the system 100 is equally applicable to other networks in which a large amount of data is stored and searchable. As such, in other embodiments, the Internet 106 may be embodied as another network such as a wide area network, local area network, enterprise network, and/or other network.

The disclosed technologies allow for searching and indexing only content relevant to the user, without requiring searching and indexing all content available over the Internet 106. Indeed, as the Internet 106 grows, it may become infeasible to search and index all content available over the Internet 106. By searching and indexing only a subset of content available over the Internet 106, the cognitive workload imposed on the user to access relevant content is decreased because a set of content is provided that is relevant to the user's interests and consistent with the user's understandings of the relationships between concepts. Concretely, search results are more relevant and require less manual winnowing of irrelevant results. Further, by proactively providing relevant content to the user based on current context, relevant content may be surfaced to the user that would otherwise be forgotten and unused.

Figure 2:
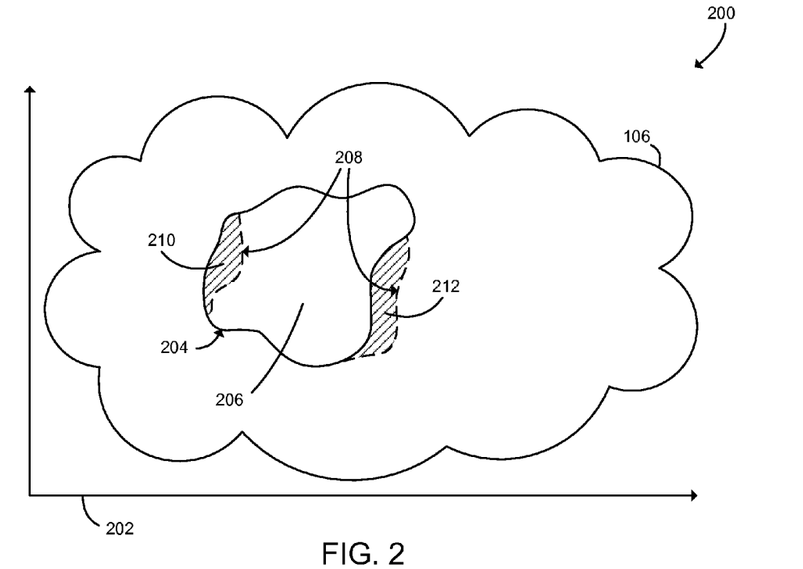
FIG. 2 is a conceptual diagram of Internet content of interest to a user.

For example, referring now to FIG. 2, a conceptual diagram 200 of personalized Internet content relevant to a user of the client computing device 102 is shown. Axes 202 represent conceptual space. Points relative to the axes 202 represent a unique combination of concepts. Note that although illustrated in two dimensions, conceptual space extends along all dimensions of human thought. The Internet 106 is illustratively represented as a closed figure within the conceptual space of axes 202. The interior of the Internet 106 represents the content stored on the Internet 106 and thus covers a large portion of conceptual space. Closed FIG. 204 represents the bounds of the user's current interests, called the user's interest frontier 204. The interior 206 of the interest frontier 204 represents all of the content on the Internet 106 that is within the user's interests; that is, the intersection of the Internet 106 and the interest frontier 204. Interior 206 corresponds to the personalized search library indexed and maintained by the personalized content server 104.

The user's interest frontier 204 migrates over time as the user gains new interests and loses old ones. New interest frontier boundaries 208 represent changed boundaries of the interest frontier 204. For example, area 210 represents content that is no longer within the user's interests, and area 212 represents content that is newly within the user's interests.

Referring back to FIG. 1, the client computing device 102 may be embodied as any type of device for performing the functions described herein. For example, the client computing device 102 may be embodied as, without limitation, a computer, a smart phone, a tablet computer, a laptop computer, a notebook computer, a mobile computing device, a desktop computer, a work station, a cellular telephone, a handset, a messaging device, a vehicle telematics device, a network appliance, a web appliance, a distributed computing system, a multiprocessor system, a processor-based system, a consumer electronic device, a digital television device, and/or any other computing device configured to generate user content events. As shown in FIG. 1, the illustrative client computing device 102 includes a processor 120, a memory 124, an input/output subsystem 122, a communication circuit 128, and a data storage device 126. Of course, the client computing device 102 may include other or additional components, such as those commonly found in a desktop computer (e.g., various input/output devices), in other embodiments. Additionally, in some embodiments, one or more of the illustrative components may be incorporated in, or otherwise from a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the client computing device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the client computing device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the client computing device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may store locally-accessible content for the client computing device 102. In some embodiments, the data storage device 126 may store, permanently or temporarily, content relevant to the user's interests that has been cached from the Internet 106. In other embodiments, such cached data may be stored on the personalized content server 104.

The communication circuit 128 of the client computing device 102 may be embodied as any communication circuit, device, or collection thereof, capable of enabling communications between the client computing device 102, the personalized content server 104, and/or other remote devices. The communication circuit 128 may be configured to use any one or more communication technology (e.g., wireless or wired communications) and associated protocols (e.g., Ethernet, Bluetooth®, Wi-Fi®, WiMAX, etc.) to effect such communication.

The personalized content server 104 may be embodied as any type of server computing device, or collection of devices, capable of performing the functions described herein. As such, the personalized content server 104 may be embodied as a single server computing device or a collection of servers and associated devices. For example, in some embodiments, the personalized content server 104 is embodied as a cloud service to perform the functions described herein. In such embodiments, the personalized content server 104 may be embodied as a "virtual server" formed from multiple computing devices distributed across the Internet 106 and operating in a public or private cloud. Accordingly, although the personalized content server 104 is illustrated in FIG. 1 and described below as embodied as single server computing device, it should be appreciated that the personalized content server 104 may be embodied as multiple devices cooperating together to facilitate the functionality described below. Illustratively, the personalized content server 104 includes a processor 140, an I/O subsystem 142, a memory 144, a data storage 146, a communication circuitry 148, and/or other components and devices commonly found in a computer server or similar computing device. Those individual components of the personalized content server 104 may be similar to the corresponding components of the client computing device 102, the description of which is applicable to the corresponding components the personalized content server 104 and is not repeated herein so as not to obscure the present disclosure.

As discussed in more detail below, the client computing device 102 is configured to transmit and receive data with the personalized content server 104 over the Internet 106. The Internet 106 is a publicly-accessible, global network composed of a number of various wired and/or wireless networks. The client computing device 102 and the personalized content server 104 are additionally capable of accessing content stored on remote hosts over the Internet 106. As such, the Internet 106 includes any number of additional devices, such as additional remote hosts, computers, routers, and switches, to facilitate communications between the client computing device 102, the personalized content server 104, and other devices.

Figure 3:
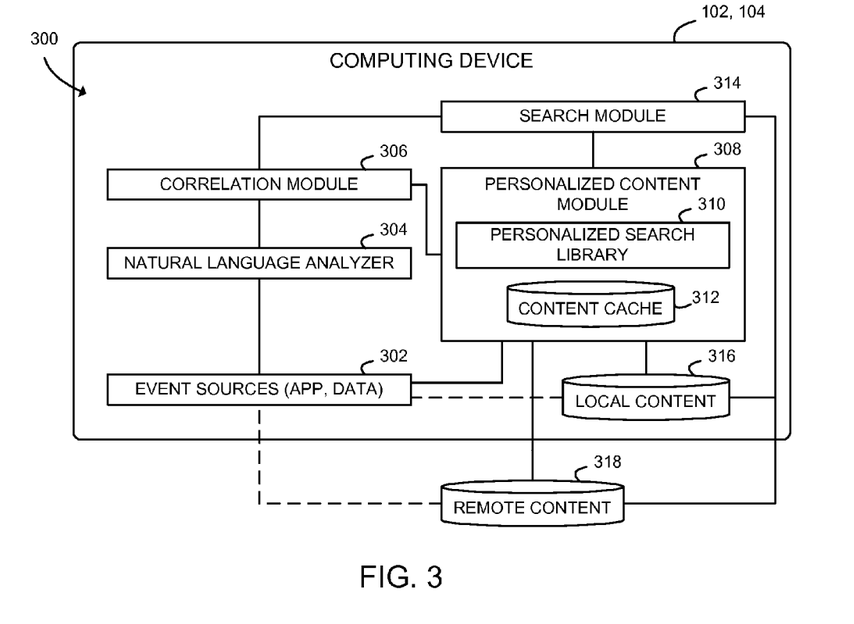
FIG. 3 is a simplified block diagram of at least one embodiment of an environment of a client computing device or a personalized content server of FIG. 1.

Referring now to FIG. 3, in one embodiment, the client computing device 102 establishes an environment 300 during operation. In another embodiment, the personalized content server 104 may establish the environment 300. In still another embodiment, both computing devices 102, 104 may establish the environment 300 or an environment similar thereto, and functionality may be distributed or duplicated between the computing devices 102, 104. The illustrative environment 300 includes one or more event sources 302, a natural language analyzer 304, a correlation module 306, a personalized content module 308, and a search module 314. The environment 300 accesses local content 316 and remote content 318. The various modules of the environment 300 may be embodied as hardware, firmware, software, or a combination thereof.

The event sources 302 are embodied as applications and data objects that are configured to generate content events. Content events may be embodied as notifications corresponding to the content currently being accessed or manipulated by the user of the client computing device 102. The content events may identify, reference, or include the corresponding content and any associated metadata. The event sources 302 may be resident on the client computing device 102 or on the personalized content server 104 or may be distributed between the computing devices 102, 104.

The natural language analyzer 304 is configured to receive content events generated by the event sources 302, parse the content associated with the content events, and extract a stream of content concepts. The content concept stream may be a series of main topics of the content accessed or manipulated by the user of the client computing device 102 or indicia of those main topics (e.g., symbols or codes). The natural language analyzer 304 may parse the actual content accessed or manipulated by the user as well as any associated metadata.

The correlation module 306 is configured to continually correlate the content concept stream received from the natural language analyzer 304. The correlation module 306 correlates the content concept stream by grouping related concepts into a concept model and assigning relative weights to the concepts. The concept model may be a data structure storing the content concepts, the correlations between the content concepts, and the relative weights of the content concepts. The relationships between concepts may be determined based on the ordering of user events produced by interaction from the user.

The personalized content module 308 maintains a personalized search library 310, which is an indexed collection of personalized content derived from the local content 316 and/or the remote content 318. The personalized search library 310 is organized according to the concept model produced by the correlation module 306. The personalized content module 308 may cache or otherwise store the content of the personalized search library 310 in a content cache 312.

The search module 314 searches the local content 316 and/or the remote content 318 for content relevant to the user's current context as determined by the correlation module 306. The user's current content represents the content concepts with which the user is actively engaged. The search module 314 provides search results to the personalized content module 308 to allow the personalized search library 310 to be updated. The search module 314 may perform the search reactively in response to a request from the user or proactively in response to a change in the concept model.

The local content 316 includes content available locally to the client computing device 102, that is, content stored in the data storage 126 of the client computing device 102, in peripheral data storage devices of the client computing device 102 such as removable memory cards or hard disk drives, or on a locally accessible network storage device such as a local file server or a network-attached storage device. The remote content 318 includes content stored remotely from the client computing device 102, that is, content accessible from remote hosts over the Internet 106.

Figure 4:
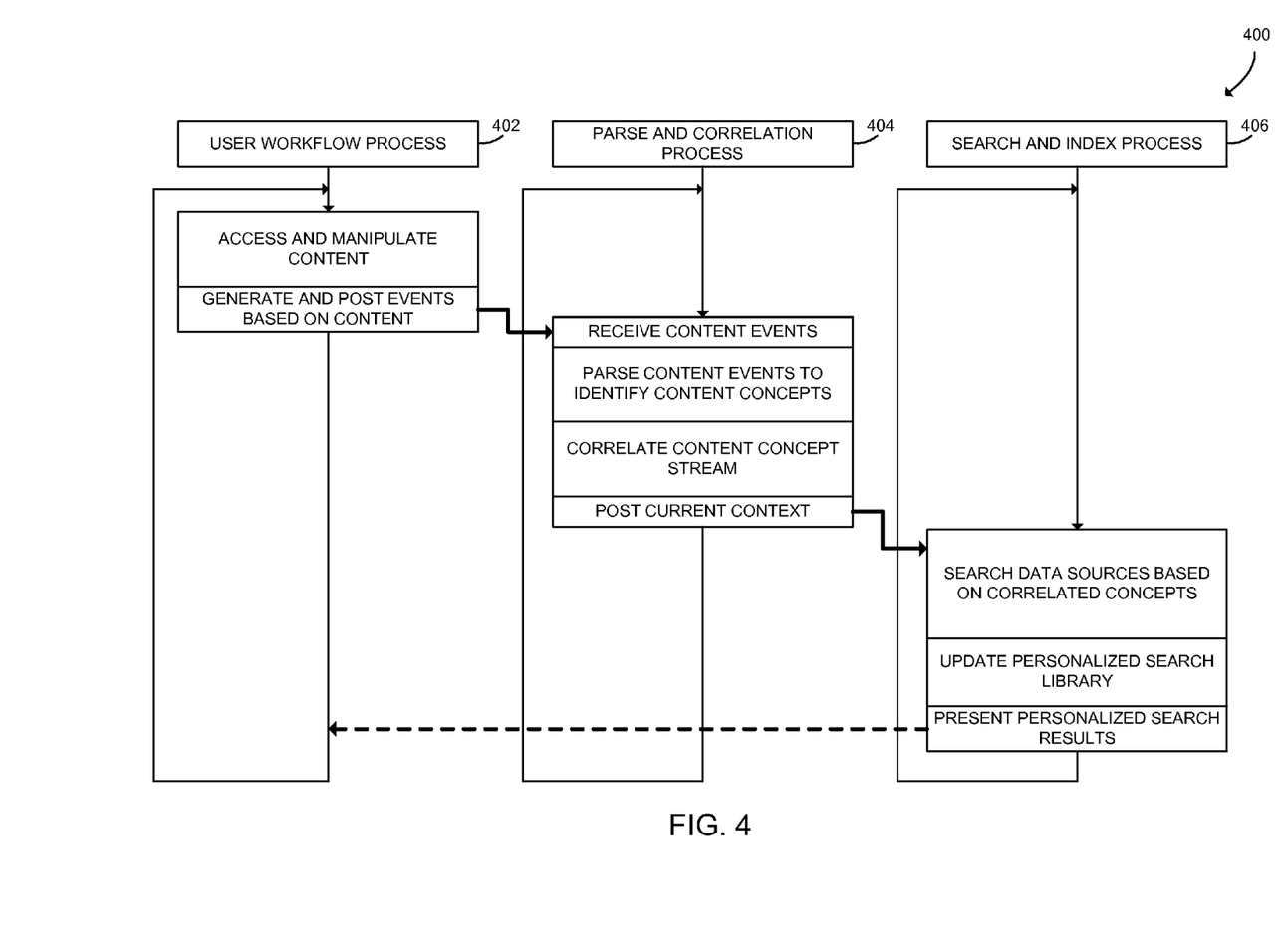
FIG. 4 is a simplified interaction diagram of at least one embodiment of processes for providing a personalized search library based on continual concept correlation that may be executed by the computing device or computing devices of FIGS. 1 and 3.

Referring now to FIG. 4, an interaction diagram 400 illustrates three high-level processes that may be executed by the client computing device 102 and/or the personalized content server 104. User workflow process 402 allows the user to access and manipulate content on the client computing device 102. As the user works, the user workflow process 402 generates and posts content events based on the content accessed and manipulated by the user. Content events may be generated based on any user content interaction, including web pages viewed, documents manipulated, emails read or written, music and video played, and the like. In some embodiments, content events are generated directly by applications of the client computing device 102. In other embodiments, an external process may generate content events, for example, based on network traffic analysis. The content events are posted to a parse and correlation process 404. After posting, the user workflow process 402 continues and may generate additional content events. Thus, as the user goes about his or her ordinary day using the client computing device 102, content events are continually generated which may be correlated and indexed by the parse and correlation process 404 and the search and index process 406.

The parse and correlation process 404 receives the content events and parses the content corresponding to the content events to identify content concepts, producing an ordered stream of content concepts. After extracting the content concepts, the parse and correlation process 404 correlates the content concept stream, producing a concept model. The most recent changes to the concept model establishes the user's current context, which is posted to a search and index process 406. After posting, the parse and correlation process 404 continues to continually parse and correlate the content concept stream.

The search and index process 406 receives the current context from the concept model. The search and index process 406 searches the local content 316 and the remote content 318 for content relevant to the current context. The search and index process 406 updates the personalized search library 310 maintained by the personalized content module 308 with results of the search. The search and index process 406 presents the personalized search results to the user. Such personalized search results are forwarded to the user workflow process 402 and may be accessed or manipulated by the user, which in turn generates content events in the user workflow process 402. The search and index process 406 thus continues to search, updating the personalized search library 310 as the user's interests change over time.

Figure 5:
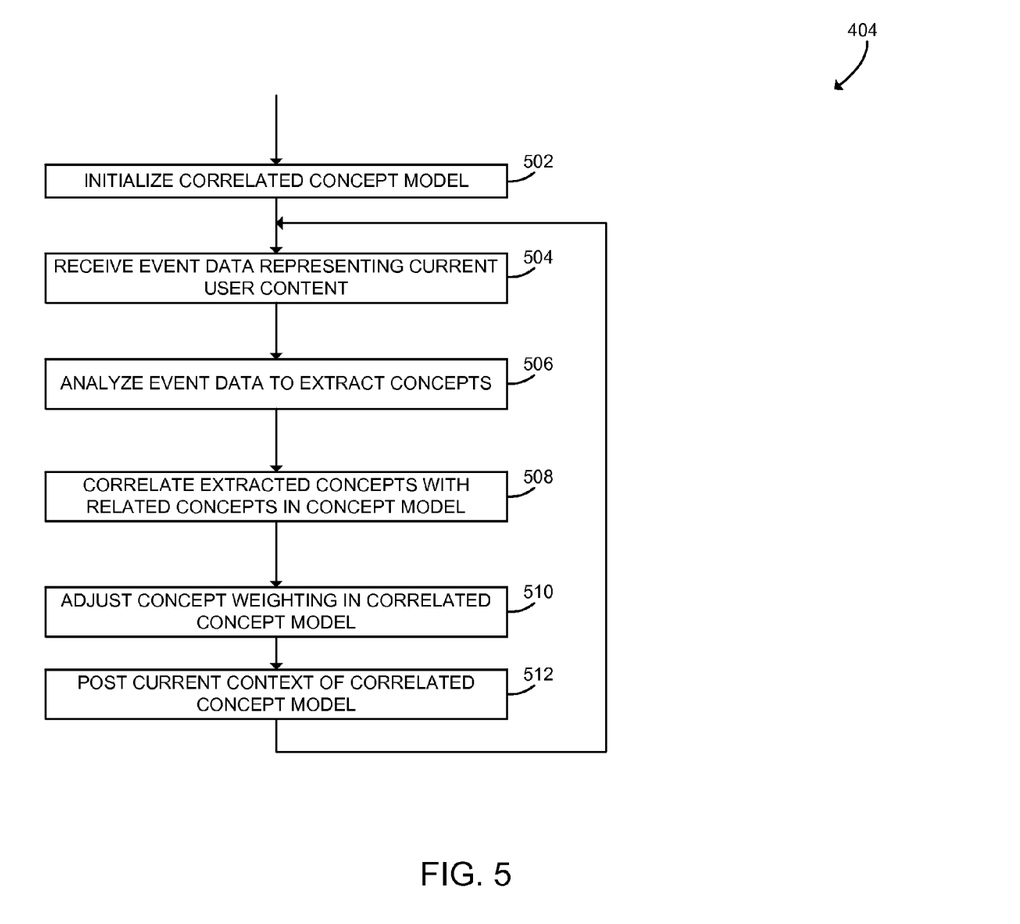
FIG. 5 is a simplified flow diagram of at least one embodiment of a method for continually correlating concepts that may be executed by the computing device or computing devices of FIGS. 1 and 3.

Referring now to FIG. 5, in use, the personalized content server 104 may execute the parse and correlation process 404. Although illustrated as executing on the personalized content server 104, in other embodiments the process 404 may execute on the client computing device 102. The process 404 begins with block 502, in which the personalized content server 104 initializes the concept model. The concept model may be initialized in an empty state; that is, the concept model may contain no concepts and no relations between concepts. In other embodiments, the concept model may be restored to a previously saved state, or may be initialized with default concepts and relationships between concepts.

In block 504, the personalized content server 104 receives event data representing content that the user is currently accessing or manipulating. Such content is ultimately being accessed or manipulated on the client computing device 102. However, the event data corresponding to the content may be generated on the client computing device 102 or on the personalized content server 104. Event data corresponding to content may include representations of the content itself, or may include references to the actual content. In any case, the content is made available to the personalized content server 104.

In block 506, the personalized content server 104 analyzes the event data to extract concepts. The personalized content server 104 applies a natural language parsing algorithm to the content and any metadata associated with the content in order to identify key concepts and main topics of the content. Through such natural language analysis, the personalized content server 104 transforms the potentially unstructured content accessed or modified by the user into a stream of symbols representing concepts that can be manipulated by the personalized content server 104. The stream of content concepts maintains the temporal or causal ordering of content accessed and manipulated by the user; such ordering contains information about the relationship between concepts.

Figure 6:
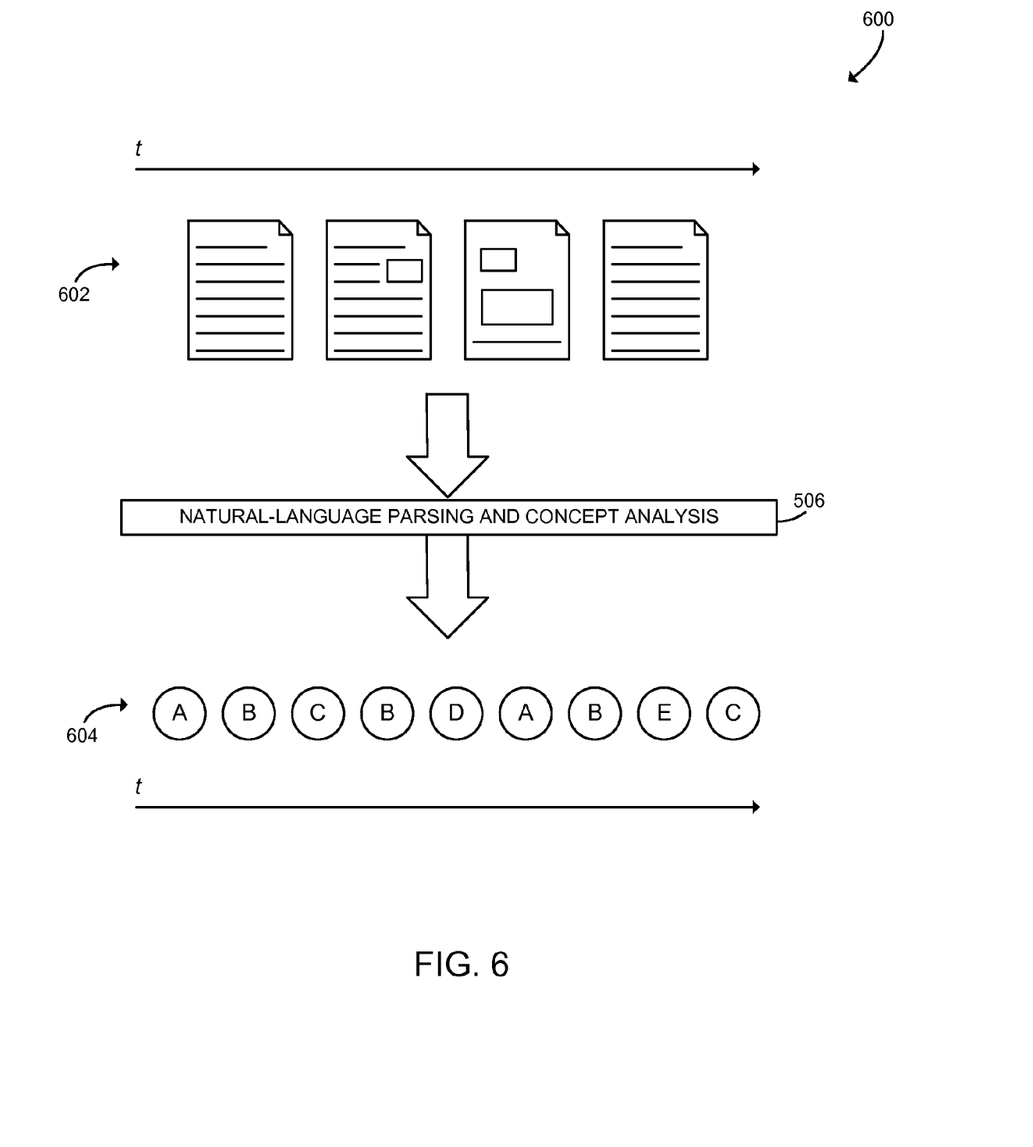
FIG. 6 is a conceptual diagram of a natural language analysis process that may be executed by the computing device or computing devices of FIGS. 1 and 3.

Referring now to FIG. 6, conceptual diagram 600 illustrates the natural language analysis and extraction of concepts from content event data. In diagram 600, time flows from left to right. Content events 602 are received as they are generated based on user activity. Content events 602 may include multiple types of content; for example, web pages, word processing documents, music, and email. The content events 602 are analyzed in block 506, as discussed above, which results in a stream of content concepts 604. The content concepts 604 represent distinct topics that have been identified from the content events 602. Each distinct content concept is illustratively labeled in FIG. 6 with a unique identifier. Note that certain content concepts (e.g., A, B, and C) repeat, meaning that such repeated content concepts are present in the content events 602.

Referring back to FIG. 5, after producing the content concept stream in block 506, the process 404 advances to block 508. In block 508, the personalized content server 104 builds correlations between extracted content concepts in the concept model. The ordering of content concepts tends to reveal the triggering or causal relationships between concepts for the user. Typically, some aspect of the current context acts as stimulus for the user's next action. By basing associations between concepts on the order of content concepts, the concept model parallels the user's mental associations between concepts.

For example, referring again to FIG. 6, consider the scenario in which the user watches a television program on Greek cooking. Concept A may represent cooking, and concept B may represent Greece. A correlation is established between concept A and concept B. Consider that the user next initiates a web browsing session and views several recipes for Greek food. Concept C may represent *dolmades*, and concept D may represent *tiropita*. Thus, concept C and concept D are correlated to concept A and concept B. Further, the correlation between concept A and concept B may be strengthened, because the user demonstrates continued interest in Greek cooking.

As another example, consider another scenario in which the user watches the same television program on Greek cooking, and that concept A again represents cooking and concept B again represents Greece. However, consider that the user next initiates a web browsing session and views web pages on Greek history and tourism. Concept C may represent Greek mythology. Concept D may represent Greek ruins. Rather than establishing correlations between Greece and cooking, the concept model may establish correlations with Greece itself.

Referring back to FIG. 5, in block 510, the personalized content server 104 adjusts the weight given to the concepts of the concept model, based on the extracted content concept stream. Concepts in the concept model are weighted analogously to the way the user forms memories. The user's memory is naturally structured around anchor concepts, which are generally frequently encountered or conceptually important concepts. Remembering an anchor concept allows the user to remember other, related concepts. Accordingly, concepts in the concept model are weighted so that the most common concepts form clusters with other related concepts. Thus by correlating and weighing concepts based on user activity, the conceptual model adapts to and parallels the structure of the user's memory.

Figure 7:
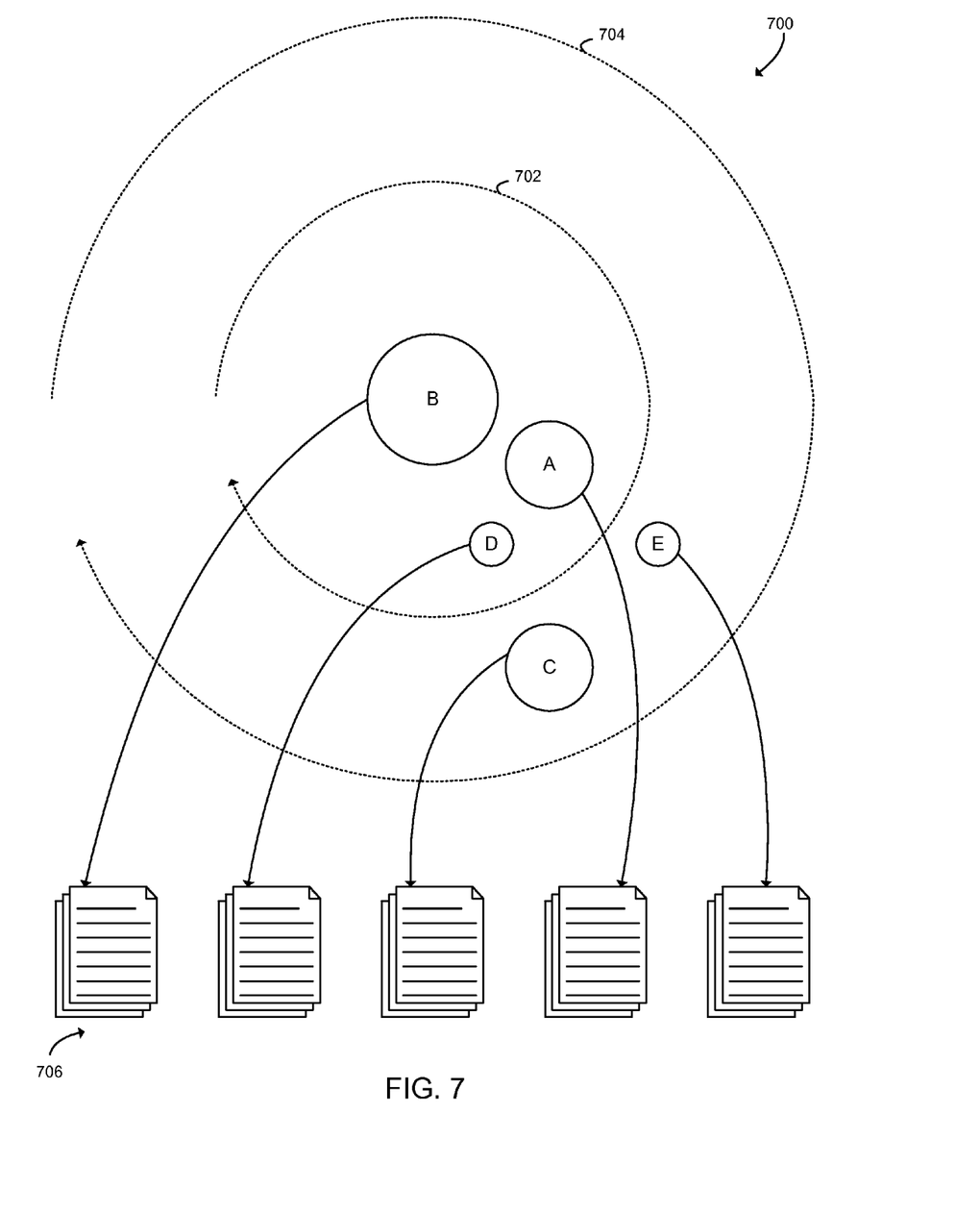
FIG. 7 is a conceptual diagram of at least one embodiment of a concept model that may be generated by the computing device or computing devices of FIGS. 1 and 3.

For example, referring now to FIG. 7, a conceptual diagram 700 illustrates a weighted conceptual model. Each anchor concept can be analogized to a mass in space that creates a gravity well. More heavily weighted concepts create a larger gravity well and exert more influence on neighboring concepts. More closely related concepts group further down the gravity well, orbiting more closely to the anchor concept. In the illustrative example, the concepts A-E are illustrated with sizes corresponding to weights. Concept B has the greatest weight and thus serves as an anchor concept, establishing the main gravity well. Orbital 702 contains concepts A and D. These concepts are closely related to concept B. Concept A is larger and therefore more heavily weighted than concept D. Beyond orbital 702, orbital 704 contains concepts C and E. These concepts are less closely related to concept B. Concept C is more heavily weighted than concept E. Although a single gravity well is illustrated, the concept model may maintain a gravity well for each concept, or for each anchor concept.

Referring back to FIG. 5, in block 512, the personalized content server 104 posts the current context of the concept model. That is, the personalized content server 104 makes data available on the concepts of the content being accessed or manipulated by the user, as well as the current state of the concept model. This current context information is used by the search and index process 406, as described in detail below. After posting the current context, the process 404 loops back to block 504 to receive new event data.

Figure 8:
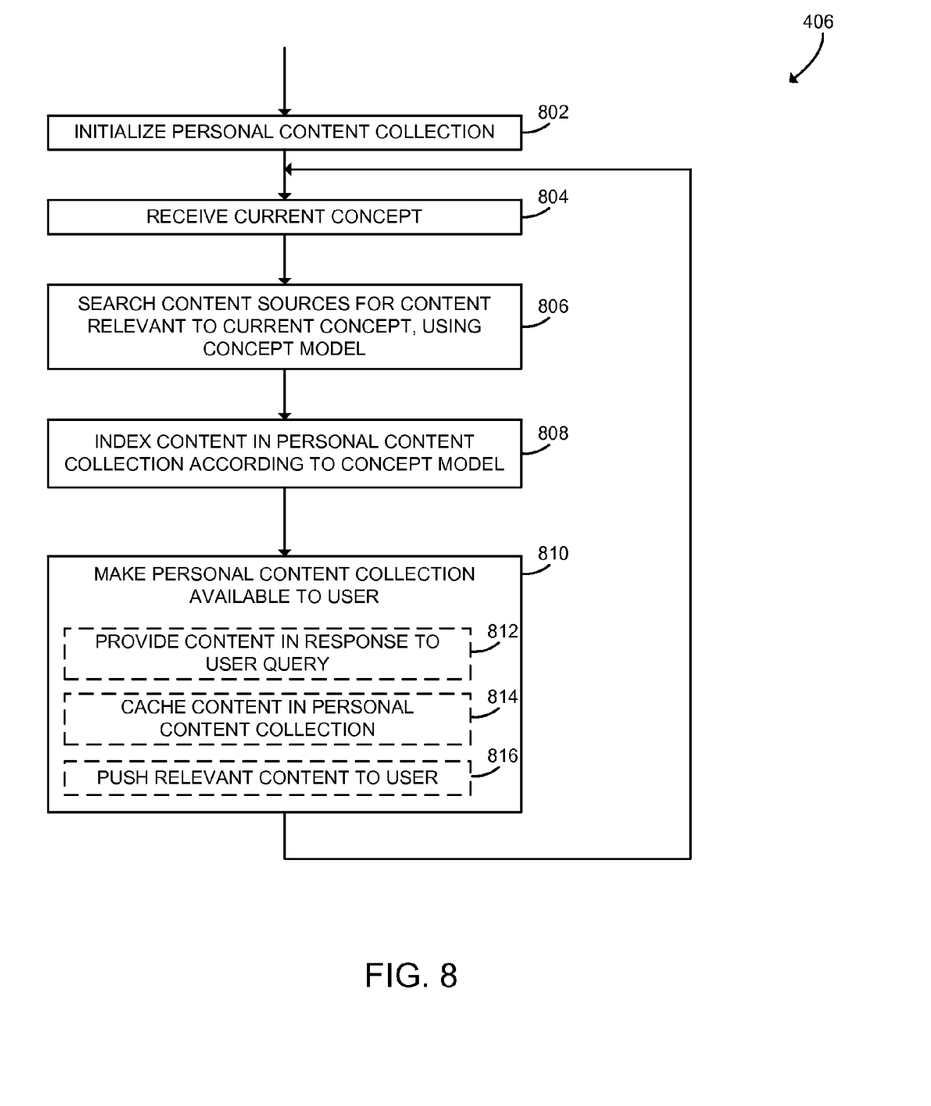
FIG. 8 is a simplified flow diagram of at least one embodiment of a method for searching and indexing a personalized search library that may be executed by the computing device or computing devices of FIGS. 1 and 3.

Referring now to FIG. 8, in use, the personalized content server 104 may execute the search and index process 406. Although illustrated as executing on the personalized content server 104, in other embodiments the process 406 may execute on the client computing device 102. The process 406 begins with block 802, in which the personalized content server 104 initializes a personalized search library 310 for the user. The personalized search library 310 may include references to content stored in local content 316 or remote content 318, or may reference cached copies of the content itself stored in the content cache 312. The personalized search library 310 may be initialized to an empty state, or may be restored to a previously saved state.

In block 804, the personalized content server 104 receives the current context produced from the parse and correlation process 404. In this manner, the process 406 becomes aware of the content concepts currently being accessed or manipulated by the user. As discussed above, user activity is typically driven by preceding events. Therefore, the current context may form the stimulus for the user's next activity. Searching for content based on current context may, therefore, provide relevant content to the user without requiring an express search request.

In block 806, the personalized content server 104 searches available content sources—the local content 316 and/or the remote content 318—for content relevant to the current concept. The search uses the concept model produced by the parse and correlation process 404. The search may use the concept model to generate related concepts and search terms, or may be used to sort and filter search results received from a traditional search.

For example, referring again to FIG. 7, consider that the current context involves concept B, which is an anchor concept. The personalized content server 104 therefore starts its search with concept B. The search progress up the gravity well to the first orbital 702, which includes concepts A and D. As discussed above, such concepts are clustered together in orbital 702 in a structure analogous to the user's memory. Such clustering typically corresponds to the user's preferred search strategy. For example, some users tend to group concepts according to the persons involved; that is, concepts are grouped according to "who" is related. Other users group concepts based on other factors, such as common places, times, or things. When formulating a search strategy for relevant content, the user generally uses search terms based on the preferred grouping factor. Continuing the example, the orbital 702 may represent the "who" question. Concepts A and D are thus related by a common person to concept B. The orbital 704, which is less tightly bound to concept B, may represent a "what" question. That is, concepts C and E are related by a common subject matter to concept B. Thus, by starting the search with concept B and then working through concepts up the gravity well, the personalized content server 104 formulates searches that correspond to the user's typical mode of thinking.

As a concrete example, consider the user watching a movie starring an actor represented by concept B. Orbital 702, representing "who," is populated by concepts A and D that may represent other actors appearing in movies with actor B. Thus, the first or most relevant search results may include content relating to actors represented by concepts B, A, and D. Orbital 704, representing "what," is populated with concepts C and E that may represent the subject matter of movies featuring actor B. Accordingly, the next search results may include content relating to subject matter represented by concepts C and E. Because such search strategy is based on a concept model that has been tailored to the individual user, the search results are more likely to be relevant to the user.

Referring back to FIG. 8, after searching in block 806, in block 808 the personalized content server 104 indexes the personalized search library 310 according to the concept model. Such index allows particular content to be retrieved or otherwise viewed based on content concept. In some embodiments, the personalized content server 104 may cache relevant content in the content cache 312, allowing for later offline access. For example, referring again to FIG. 7, the search library 706 indexes content discovered through search. Each of the concepts A-E references particular content within the search library 706. Thus, the search library 706 represents an indexed collection of content within the user's conceptual interests; that is, the search library 706 represents the interior 206 of the user's interest frontier 204, as discussed in relation to FIG. 2 above. The concept model serves as an index to the content within the user's interests.

Referring back to FIG. 8, after indexing the search results in block 808, in block 810, the personalized content server 104 makes the personalized search library 310 available to the user. In some embodiments, in block 812, the personalized content server 104 may provide the content in response to a user query. For example, the relevant content may be provided in response to a traditional web search query. In some embodiments, in block 814, the personalized content server 104 may provide access to content stored in the personalized search library 310. The personalized search library 310 may make such content available to the user in an operating system folder, a custom application, or the like. Such stored content may be available to the user at any time, without requiring an explicit user search. In some embodiments, in block 816, the personalized content server 104 may push relevant content to the user. That is, the personalized content server 104 retrieves relevant content and presents the content to the user without receiving a specific search query or interaction requesting the content from the user. For example, the personalized content server 104 may provide the user with a dialog box, system notification, push notification, personalized news feed, or the like providing access to the relevant content. Such notifications may prompt the user to access relevant content that would otherwise be forgotten. Even if relevant content is not immediately transmitted to the user, such content remains incorporated in the user's personalized search library 310 and available for future use. After making the relevant content available to the user, the process 406 loops back to block 804 to continue searching and indexing content.

In some embodiments (not illustrated), the concept model produced by the correlation module 306 may be decoupled from the personalized search library 310. Such decoupled concept model acts as a customization key describing the user's personality. The decoupled concept model may be portable among various search engines, shopping sites, and other web services. The decoupled concept model may be used to generate and improve search results, recommendations, and other personalized services.

In some embodiments (not illustrated), the user may be identified as an expert in a particular field or fields. Expert status may be determined based on extended use and observation of the user's activities. Identifying the user as an expert allows the correlation module 306 to disambiguate concepts and perform detailed correlations in the expert's field of expertise that may otherwise be combined or simplified for other users. Additionally, a decoupled concept model associated with an expert user may be used to generate search results for other users. For example, content and concepts used by expert users in their area of expertise may gain greater weight, and therefore be determined to be more relevant. Thus, search results may be improved for all users through observing the actions of experts.

EXAMPLES

Example 1 includes a computing device to provide a personalized search library based on continual concept correlation. The computing device includes a natural language analyzer to (i) receive event data representing content accessed by a user of a client computing device and (ii) analyze the event data to extract concepts of the content; and a correlation module to (i) correlate the extracted concepts based on an order of the event data, (ii) adjust a weight of each extracted concept based on a frequency of the extracted concept occurring in the content, and (iii) store the correlated and weighted extracted concepts in a concept model that identifies the relative correlation and weights between each extracted concept.

Example 2 includes the subject matter of Example 1, and wherein the natural language analyzer comprises a natural language analyzer to apply a natural language parsing algorithm to the content associated with the event data.

Example 3 includes the subject matter of any of Examples 1 and 2, and wherein the correlation module comprises a correlation module to correlate the extracted concepts based on a causal order of the event data.

Example 4 includes the subject matter of any of Examples 1-3, and wherein the correlation module comprises a correlation module to port the concept model to a web service for use as a key to a personality of the user.

Example 5 includes the subject matter of any of Examples 1-4, and wherein the correlation module comprises a correlation module to (i) identify the user as an expert in a field and (ii) use the concept model to generate search results in the field for other users in response to the user being identified as an expert.

Example 6 includes the subject matter of any of Examples 1-5, and further including a search module to search one or more content sources for relevant search results based on a current context of the concept model; and a personalized content module to (i) index the search results in the personalized search library according to the concept model and (ii) facilitate access to the personalized search library by the user.

Example 7 includes the subject matter of any of Examples 1-6, and wherein the one or more content sources comprise a local content source.

Example 8 includes the subject matter of any of Examples 1-7, and wherein the one or more content sources comprise a remote content source.

Example 9 includes the subject matter of any of Examples 1-8, and wherein the one or more content sources comprise the Internet.

Example 10 includes the subject matter of any of Examples 1-9, and wherein the personalized content module comprises a personalized content module to provide content from the personalized search library to the user in response to a search query from the user.

Example 11 includes the subject matter of any of Examples 1-10, and wherein the personalized content module comprises a personalized content module to (i) retrieve content indexed by the personalized search library and (ii) store the retrieved content in a content cache of the computing device.

Example 12 includes the subject matter of any of Examples 1-11, and wherein the personalized content module comprises a personalized content module to (i) retrieve content indexed by the personalized search library and (ii) provide the content to the user.

Example 13 includes the subject matter of any of Examples 1-12, and wherein the computing device is a personalized content server.

Example 14 includes the subject matter of any of Examples 1-12, and wherein the computing device is the client computing device.

Example 15 includes a method to provide a personalized search library based on continual concept correlation. The method includes receiving event data representing content accessed by a user of a client computing device; analyzing the event data to extract concepts of the content; correlating the extracted concepts based on an order of the event data; adjusting a weight of each extracted concept based on a frequency of the extracted concept occurring in the content; and storing the correlated and weighted extracted concepts in a concept model that identifies the relative correlation and weights between each extracted concept.

Example 16 includes the subject matter of Example 15, and wherein analyzing the event data comprises applying a natural language parsing algorithm to the content associated with the event data.

Example 17 includes the subject matter of Examples 15 and 16, and wherein correlating the extracted concepts comprises correlating the extracted concepts based on a causal order of the event data.

Example 18 includes the subject matter of Examples 15-17, and further including porting the concept model to a web service for use as a key to a personality of the user.

Example 19 includes the subject matter of Examples 15-18, and further including identifying the user as an expert in a field; and using the concept model to generate search results in the field for other users in response to the user being identified as an expert.

Example 20 includes the subject matter of Examples 15-19, and further including searching one or more content sources for relevant search results based on a current context of the concept model; indexing the search results in the personalized search library according to the concept model; and facilitating access to the personalized search library by the user.

Example 21 includes the subject matter of Examples 15-20, and wherein searching one or more content sources comprises searching a local content source.

Example 22 includes the subject matter of Examples 15-21, and wherein searching one or more content sources comprises searching a remote content source.

Example 23 includes the subject matter of Examples 15-22, and wherein searching one or more content sources comprises searching the Internet.

Example 24 includes the subject matter of Examples 15-23, and wherein allowing the user to access the personalized search library comprises providing content from the personalized search library to the user in response to a search query from the user.

Example 25 includes the subject matter of Examples 15-24, and wherein allowing the user to access the personalized search library comprises retrieving content indexed by the personalized search library; and storing the retrieved content in a content cache of the computing device.

Example 26 includes the subject matter of Examples 15-25, and wherein allowing the user to access the personalized search library comprises retrieving content indexed by the personalized search library; and providing the content to the user.

Example 27 includes the subject matter of Examples 15-26, and wherein receiving the event data comprises receiving the event data on a personalized content server; analyzing the event data comprises analyzing the event data on the personalized content server; correlating the extracted concepts comprises correlating the extracted concepts on the personalized content server; adjusting the weight of the extracted concepts comprises adjusting the weight of the extracted concepts on the personalized content server; storing the correlated and weighted concepts comprises storing the correlated and weighted concepts on the personalized content server; searching the one or more content sources comprises searching the one or more content sources using the personalized content server; and indexing the personal content collection comprises indexing the personal content collection on the personalized content server.

Example 28 includes the subject matter of Examples 15-26, and wherein receiving the event data comprises receiving the event data on the client computing device; analyzing the event data comprises analyzing the event data on the client computing device; correlating the extracted concepts comprises correlating the extracted concepts on the client computing device; adjusting the weight of the extracted concepts comprises adjusting the weight of the extracted concepts on the client computing device; storing the correlated and weighted concepts comprises storing the correlated and weighted concepts on the client computing device; searching the one or more content sources comprises searching the one or more content sources using the client computing device; indexing the personal content collection comprises indexing the personal content collection on the client computing device; and allowing the user to access the personalized search library comprises allowing the user to access the personalized search library on the client computing device.

Example 29 includes a computing device comprising a processor; and a memory having stored therein a plurality of instructions that when executed by the processor cause the computing device to perform the method of any of Examples 15-28.

Example 30 includes one or more machine readable storage media comprising a plurality of instructions stored thereon that in response to being executed result in a computing device performing the method of any of Examples 15-28.

The invention claimed is:

1. A computing device to provide a personalized search library based on continual concept correlation, the computing device comprising:
natural language analyzer circuitry to (i) receive event data representing content accessed by a user of a client computing device, wherein an order of the event data represents an order that the user of the client computing device accessed the content and (ii) analyze the event data to extract concepts of the content; and
correlation circuitry to (i) correlate the extracted concepts based on the order of the event data to generate a plurality of correlations between the extracted concepts, wherein each correlation is indicative of a relationship between a first extracted concept and a second extracted concept based on the order of the event data, (ii) adjust a weight associated with each extracted concept based on a frequency of the extracted concept occurring in the content to generate an adjusted weight, and (iii) store the correlations, adjusted weights, and extracted concepts in a concept model that identifies the relative correlation between each extracted concept and the adjusted weight associated with each extracted concept.

2. The computing device of claim 1, further comprising:
search circuitry to search one or more content sources for relevant search results based on a current context of the concept model; and
personalized content circuitry to (i) index the search results in the personalized search library according to the concept model and (ii) facilitate access to the personalized search library by the user.

3. The computing device of claim 2, wherein the personalized content circuitry is further to provide content from the personalized search library to the user in response to a search query from the user.

4. The computing device of claim 2, wherein the personalized content circuitry is further to (i) retrieve content indexed by the personalized search library and (ii) store the retrieved content in a content cache of the computing device.

5. The computing device of claim 2, wherein the personalized content circuitry is further to (i) retrieve content indexed by the personalized search library and (ii) provide the content to the user.

6. The computing device of claim 2, wherein the computing device is a personalized content server.

7. The computing device of claim 2, wherein the computing device is the client computing device.

8. One or more non-transitory, machine readable media comprising a plurality of instructions that in response to being executed result in a computing device:
receiving event data representing content accessed by a user of a client computing device, wherein an order of the event data represents an order that the user of the client computing device accessed the content;
analyzing the event data to extract concepts of the content;
correlating the extracted concepts based on the order of the event data to generate a plurality of correlations between the extracted concepts, wherein each correlation is indicative of a relationship between a first extracted concept and a second extracted concept based on the order of the event data;
adjusting a weight associated with each extracted concept based on a frequency of the extracted concept occurring in the content to generate an adjusted weight; and
storing the correlations, adjusted weights, and extracted concepts in a concept model that identifies the relative correlation between each extracted concept and the adjusted weight associated with each extracted concept.

9. The one or more non-transitory, machine readable media of claim 8, further comprising a plurality of instructions that in response to being executed result in the computing device:
searching one or more content sources for relevant search results based on a current context of the concept model;
indexing the search results in the personalized search library according to the concept model; and
facilitating access to the personalized search library by the user.

10. The one or more non-transitory, machine readable media of claim 9, wherein allowing the user to access the personalized search library comprises providing content from the personalized search library to the user in response to a search query from the user.

11. The one or more non-transitory, machine readable media of claim 9, wherein allowing the user to access the personalized search library comprises:
retrieving content indexed by the personalized search library; and
storing the retrieved content in a content cache of the computing device.

12. The one or more non-transitory, machine readable media of claim 9, wherein allowing the user to access the personalized search library comprises:
retrieving content indexed by the personalized search library; and
providing the content to the user.

13. The one or more non-transitory, machine readable media of claim 9, wherein the computing device is a personalized content server.

14. The one or more non-transitory, machine readable media of claim 9, wherein the computing device is the client computing device.

15. A method to provide a personalized search library based on continual concept correlation, the method comprising:
receiving, by a computing device, event data representing content accessed by a user of a client computing device, wherein an order of the event data represents an order that the user of the client computing device accessed the content;
analyzing, by the computing device, the event data to extract concepts of the content;
correlating, by the computing device, the extracted concepts based on the order of the event data to generate a plurality of correlations between the extracted concepts, wherein each correlation is indicative of a relationship between a first extracted concept and a second extracted concept based on the order of the event data;
adjusting, by the computing device, a weight associated with each extracted concept based on a frequency of the extracted concept occurring in the content to generate an adjusted weight; and
storing, by the computing device, the correlations, adjusted weights, and extracted concepts in a concept model that identifies the relative correlation between each extracted concept and the adjusted weight associated with each extracted concept.

16. The method of claim 15, further comprising:
searching, by the computing device, one or more content sources for relevant search results based on a current context of the concept model;
indexing, by the computing device, the search results in the personalized search library according to the concept model; and
facilitating, by the computing device, access to the personalized search library by the user.

17. The method of claim 16, wherein allowing the user to access the personalized search library comprises providing content from the personalized search library to the user in response to a search query from the user.

18. The method of claim 16, wherein allowing the user to access the personalized search library comprises:
retrieving content indexed by the personalized search library; and
storing the retrieved content in a content cache of the computing device.

19. The method of claim 16, wherein the computing device comprises a personalized content server.

20. The method of claim 16, wherein the computing device comprises the client computing device.

* * * * *